(12) United States Patent
Nakano

(10) Patent No.: US 6,227,996 B1
(45) Date of Patent: May 8, 2001

(54) OIL PRESSURE CONTROL DEVICE OF TOROIDAL CONTINUOUSLY VARIABLE TRANSMISSION

(75) Inventor: Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/359,309

(22) Filed: Jul. 23, 1999

(30) Foreign Application Priority Data

Jul. 30, 1998 (JP) .................................................. 10-215532

(51) Int. Cl.$^7$ .............................. F16H 57/04; F16H 61/30
(52) U.S. Cl. ..................................................... 476/8; 476/10
(58) Field of Search ............................... 476/8, 9, 10, 42; 74/569

(56) References Cited

U.S. PATENT DOCUMENTS

| | | | |
|---|---|---|---|
| 2,774,376 | 12/1956 | Young | 137/620 |
| 4,469,061 | * 9/1984 | Ajiki et al. | 123/198 F |
| 4,558,667 | 12/1985 | Inagaki et al. | 123/90.44 |
| 5,542,890 | * 8/1996 | Nakano et al. | 476/10 |
| 5,993,349 | * 11/1999 | Sugihara | 476/8 |
| 6,086,505 | * 7/2000 | Sakai | 476/10 |

FOREIGN PATENT DOCUMENTS

| | | |
|---|---|---|
| 0 373 649 | 6/1990 | (EP) . |
| 2 643 676 | 8/1990 | (FR) . |
| 2-163562 | 6/1990 | (JP) . |

\* cited by examiner

Primary Examiner—Sherry Estremsky
Assistant Examiner—Tisha D. Lewis
(74) Attorney, Agent, or Firm—Foley & Lardner

(57) ABSTRACT

When an arm (100) of a forward/reverse detection mechanism (90) rotates, a spool (82) of a change-over valve (80) in contact with the arm (100) displaces in an axial direction, and a first valve (60) and second valve (70) are selectively connected to hydraulic actuators (50, 52, 54, 56) of a transmission (10). In order to reduce the wear and friction of the arm (100), the arm (100) is formed so that a part (102) in contact with the spool (82) is an arc, and the locus (L) of the center of curvature (A) of the arc part (102) when the spool (82) is displaced, intersects with a perpendicular line (S) dropped from a rotation center (O) of the arm (100) to a center axis (T) of the spool (82).

2 Claims, 5 Drawing Sheets

OIL PRESSURE CONTROL DEVICE OF TOROIDAL CONTINUOUSLY VARIABLE TRANSMISSION

FIELD OF THE INVENTION

The present invention relates to an oil pressure control device of toroidal continuously variable transmission for a vehicle.

BACKGROUND OF THE INVENTION

A toroidal continuously variable transmission comprises power rollers between an input disk and output disk, and a rotation of the input disk is transmitted to the output disk via the power rollers. When trunnions supporting the power rollers are displaced vertically in mutually opposite directions by hydraulic actuators, the power rollers incline, and the ratio of the rotation speed of the input disk to the rotation speed of the output disk, i.e., a speed ratio, varies.

Tokkai Hei 2-163562 published by the Japanese Patent Office in 1990 discloses an oil pressure control device of the toroidal continuously variable transmission comprising a first valve and a second valve for operating the actuators which displace the trunnions. The actuators are operated by the first valve during forward running of the vehicle wherein the speed ratio varies widely, and by the second valve during reverse running of the vehicle.

SUMMARY OF THE INVENTION

A change-over between the first valve and the second valve is performed by a change-over valve. The change-over valve comprises a spool displaced by an arm which swings according to the running direction of the vehicle, and the first valve and second valve are selectively connected to the actuators according to the displacement of the spool.

In such a change-over valve, however, the contact point of the arm and the spool tend to suffer wear.

It is therefore an object of this invention to reduce wear between an arm and a spool due to a change-over operation of the change-over valve.

In order to achieve the above object, this invention provides an oil pressure control device of a toroidal continuously variable transmission for a vehicle, the transmission comprising a toroidal unit, and a hydraulic actuator for driving the toroidal unit. The device comprises a first valve and a second valve for operating the actuator, an arm which changes a rotation direction according to a running direction of the vehicle, and a change-over valve comprising a spool in contact with the arm. The change-over valve selectively connects the first valve and the second valve to the actuator according to a rotational displacement of the arm. The arm comprises an arc part in contact with the spool, and a locus of the center of curvature of the arc part, when the spool is displaced, intersects with a perpendicular line dropped from the rotation center of the arm to the center axis of the spool.

The details as well as other features and advantages of this invention are set forth in the remainder of the specification and are shown in the accompanying drawings.

DESCRIPTION OF THE PREFERRED EMBODIMENTS

Figure 1:
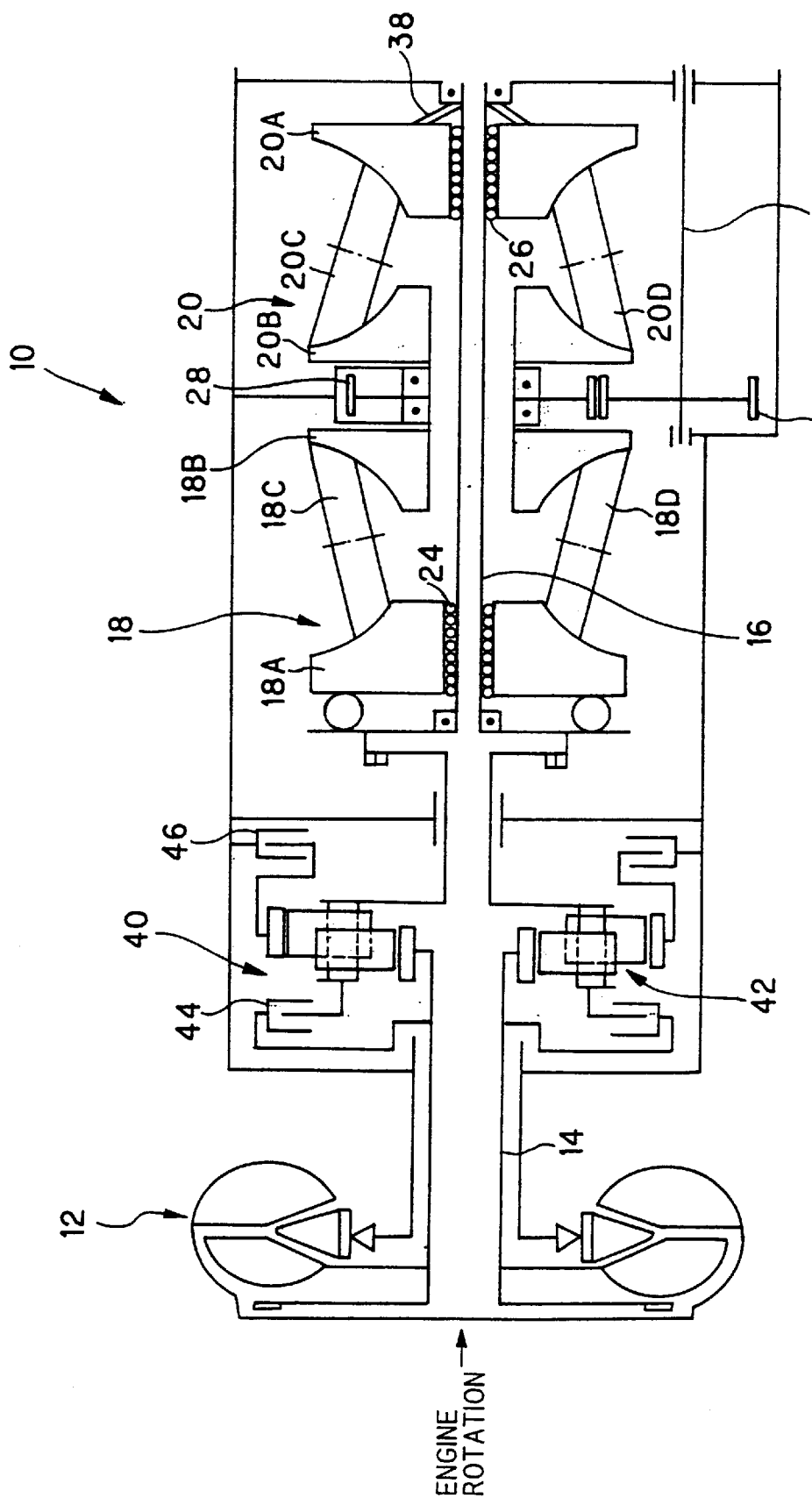
FIG. 1 is a schematic diagram of a toroidal continuously variable transmission.

Referring to FIG. 1 of the drawings, a rotation of an engine, not shown, is input to a toroidal continuously variable transmission 10 via a torque converter 12 and a forward/reverse change-over mechanism 40.

The transmission 10 comprises a torque transmission shaft 16 arranged coaxially with an output shaft 14 of the torque converter 12. A first toroidal unit 18 and second toroidal unit 20 are provided in series on the torque transmission shaft 16.

The first toroidal unit 18 comprises an input disk 18A and output disk 18B having toroidal curved surfaces. Power rollers 18C, 18D are gripped between the input disk 18A and output disk 18B. The disks 18A, 18B and power rollers 18C, 18D are in frictional contact via traction oil.

Likewise, the second toroidal unit 20 comprises an input disk 20A and output disk 20B having toroidal curved surfaces. Power rollers 20C, 20D are gripped between the input disk 20A and output disk 20B. The disks 20A, 20B and power rollers 20C, 20D are in frictional contact via traction oil.

The input disks 18A, 20A are engaged with the torque transmission shaft 16 via ball splines 24, 26 such that relative rotation is impossible but relative displacement in the axial direction is possible.

Output disks 18B, 20B are engaged with an output gear 28 via splines, this gear 28 being engaged so as to permit relative rotation with the torque transmission shaft 16.

The rotation transmitted to the output disks 18B, 20B is transmitted to a counter shaft 30 via the output gear 28 and a gear 30A engaged with the output gear 28.

The forward/reverse change-over mechanism 40 for changing over the rotation direction transmitted to the torque transmission shaft 16 so as to change over the forward and reverse running of the vehicle is provided between the torque converter 12 and toroidal unit 18.

The forward/reverse change-over mechanism 40 comprises a planetary gear unit 42, forward clutch 44 and reverse clutch 46.

When the forward clutch 44 is engaged and the reverse clutch 46 is released, the planetary gear unit 42 transmits the rotation of the engine rotation to the torque transmission shaft 16 without changing the direction. When the forward clutch 44 is released and the reverse clutch 46 is engaged, the unit 42 transmits the rotation of the engine to the torque transmission shaft 16 after reversing the direction.

The swinging angles of the power rollers 18C, 18D, 20C, 20D are controlled according to the running state of the vehicle. When the swinging angles of the power rollers 18C, 18D, 20C, 20D change, the ratio of the rotation speed of the input disks 18A, 20A to that of the output disks 18B, 20B, i.e., the speed ratio, varies.

Figure 2:
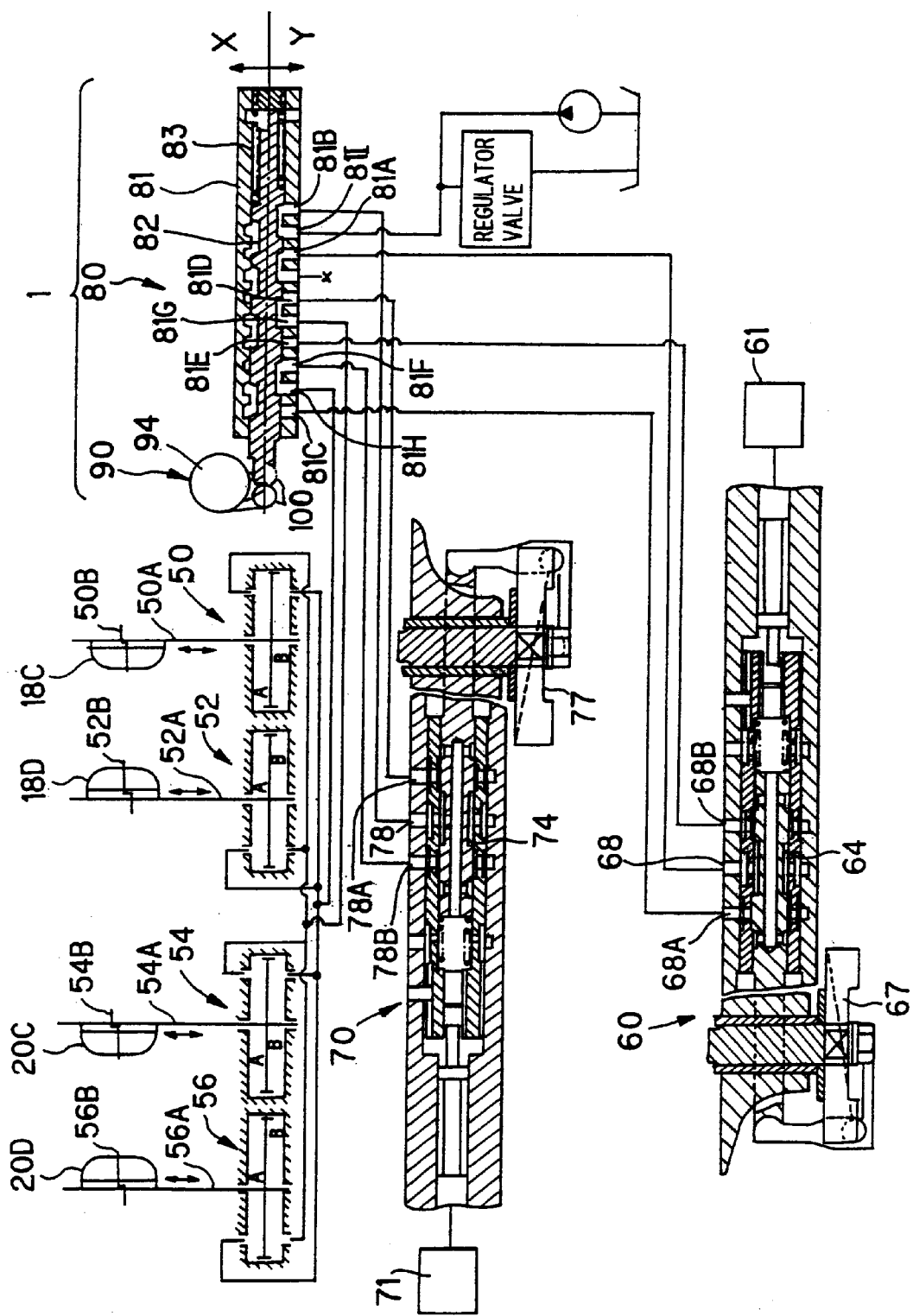
FIG. 2 is a schematic diagram of an oil pressure control device according to this invention.

The power rollers 18C, 18D, 20C, 20D are respectively supported by trunnions 50A, 52A, 54A, 56A such that they are free to rotate via eccentric shafts 50B, 52B, 54B, 56B, as shown in FIG. 2. The trunnions 50A, 52A, 54A, 56A are respectively displaced in a vertical direction by hydraulic actuators 50, 52, 54, 56. The swinging angles of the power rollers 18C, 18D, 20C, 20D vary according to the displacement of the trunnions 50A, 52A, 54A, 56A in the vertical direction. In other words, the swinging angles of the power rollers 18C, 18D, 20C, 20D are determined by the displacement amount of the hydraulic actuators 50, 52, 54, 56.

The oil pressure control device comprises a first valve 60 and second valve 70 for operating the hydraulic actuators 50, 52, 54, 56. When the vehicle is moving forward, the first valve 60 is used, and when it is reversing, the second valve 70 is used. The change-over between the first valve 60 to the second valve 70 is performed by a valve change-over mechanism 1.

The valve change-over mechanism 1 comprises a change-over valve 80 and forward/reverse detection mechanism 90.

The change-over valve 80 comprises a valve body 81 and a spool 82 inserted in the valve body 81. The spool 82 is pushed in the left direction of FIG. 2 by a spring 83. An arm 100 of the forward/reverse detection mechanism 90 comes in contact with one end of the spool 82 ending from the valve body 81.

Ports 81G, 81H which supply oil pressure from the first valve 60 or the second valve 70 to the hydraulic actuators 50, 52, 54, 56 are formed in the valve body 81.

A line pressure port 81I is also formed in the valve body 81. In FIG. 2, X shows the position of the spool 82 when the vehicle is advancing (hereafter described as advancing position), and Y shows the position of the spool 82 when the vehicle is reversing (hereafter described as reversing position).

Figure 3:
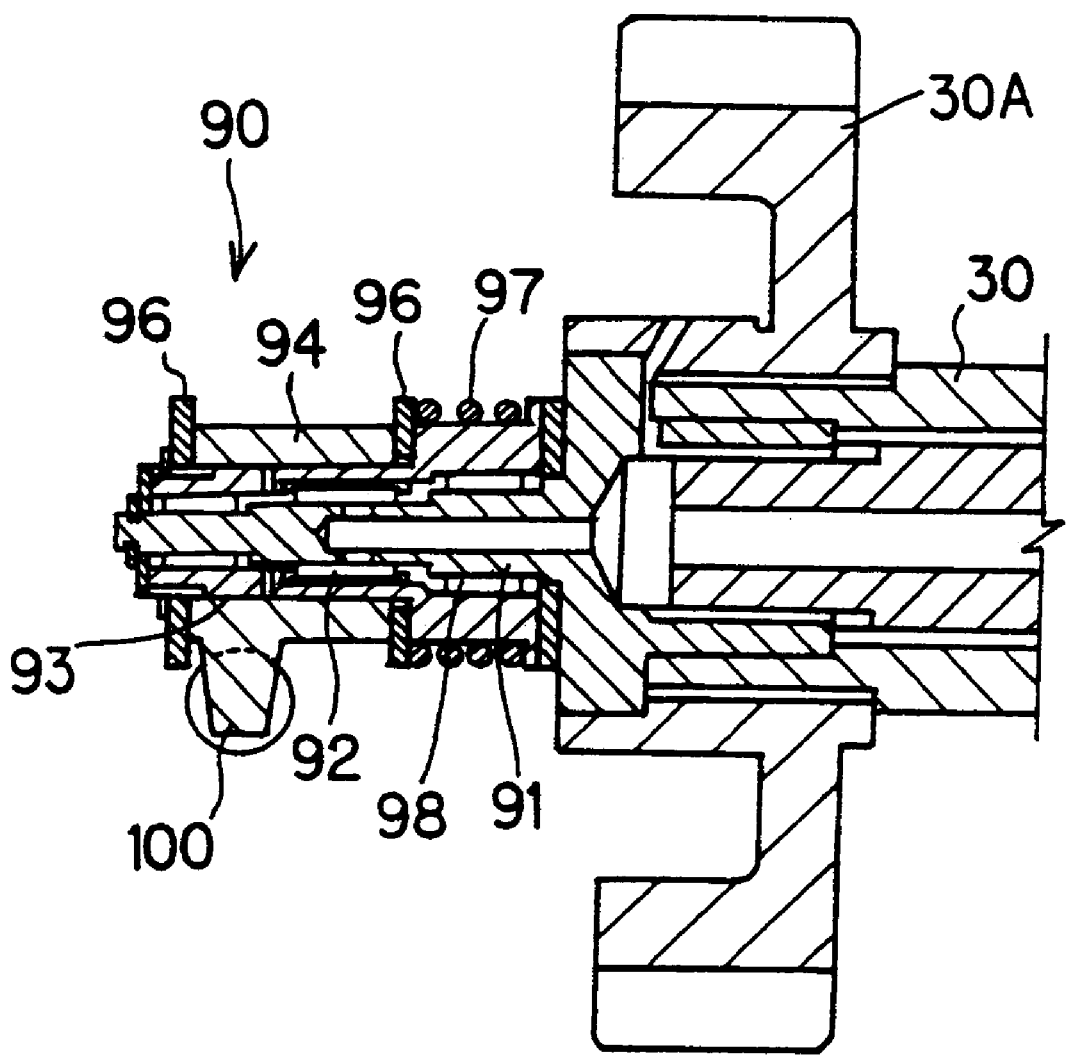
FIG. 3 is a cross sectional view of a forward/reverse detection mechanism of the oil pressure control device.

The forward/reverse detection mechanism 90 is provided on the counter shaft 30, as shown in FIG. 3. The forward/reverse detecting mechanism 90 detects whether the vehicle is advancing or reversing from the rotation direction of the counter shaft 30.

The forward/reverse detection mechanism 90 comprises a support shaft 91 extending from one end of the counter shaft 30, an intermediate collar 93 which engages with the outer circumference of the support shaft 91 via a one-way clutch 92, and a collar 94 which is fitted on the outer circumference of the intermediate collar 93.

A pair of friction plates 96 which engage with the intermediate collar 93 via a serration come in contact with the ends of the collar 94. A pushing force of the spring 97 acts on the friction plates 96 in such a direction as to grip the collar 94. The arm 100 projects from the outer circumference of the collar 94. The arm 100 comes in contact with one end of the spool 82 of the change-over valve 80. When the counter shaft 30 is rotating in the clockwise direction, i.e., when the vehicle is advancing, the one-way clutch 92 is released, and when the counter shaft is rotating anticlockwise, i.e., when the vehicle is reversing, the one-way clutch 92 locks.

As the one way clutch 92 is released when the counter shaft 30 rotates clockwise, the rotation is not transmitted to the collar 94 and arm 100. Therefore, the spool 82 moves to the advancing position shown by X in FIG. 2, due to the pushing force of the spring 83.

When the counter shaft 30 rotates anticlockwise, the one way clutch 92 is locked, and the collar 94 rotates. As a result, the spool 82 is pushed back by the arm 100, and moves to the reversing position shown by Y in FIG. 2.

Once the spool 82 moves to the reversing position, further rotation of the collar 94 is prevented by the spool 82. As a result, a relative rotation between the intermediate collar 93 and collar 94 occurs despite a resistance due to the frictional force of the friction plates 96.

When the forward/reverse change-over mechanism 40 is in the advancing state, the spool 82 moves to the advancing position. In this case, the position of a spool 64 of the first valve 60 is determined by the rotation angle of the step motor 61 and the swinging angle of the power rollers fed back via a precess cam 67 to the spool 64. The step motor 61 is driven by a control signal according to the vehicle running state from a control unit, not shown. Oil pressure from a first port 68A and second port 68B is supplied to the hydraulic actuators 50, 52, 54, 56 respectively according to the position of the spool 64. Due to this, the swinging angle of the power rollers 18C, 18D, 20C, 20D varies to a desired angle.

On the other hand, when the forward/reverse change-over mechanism 40 is changed over to the reverse state, the spool 82 moves to the reversing position. In this case, the position of the spool 74 of the second valve 70 is determined by the rotation angle of the step motor 71 and the swinging angle of the power rollers fed back via a precess cam 77 to the spool 82.

The oil pressure from the first port 78A and second port 78B is supplied to the hydraulic actuators 50, 52, 54, 56 respectively according to the position of the spool 77. Due to this, the swinging angle of the power rollers 18C, 18D, 20C, 20D varies to the desired angle.

Figure 4:
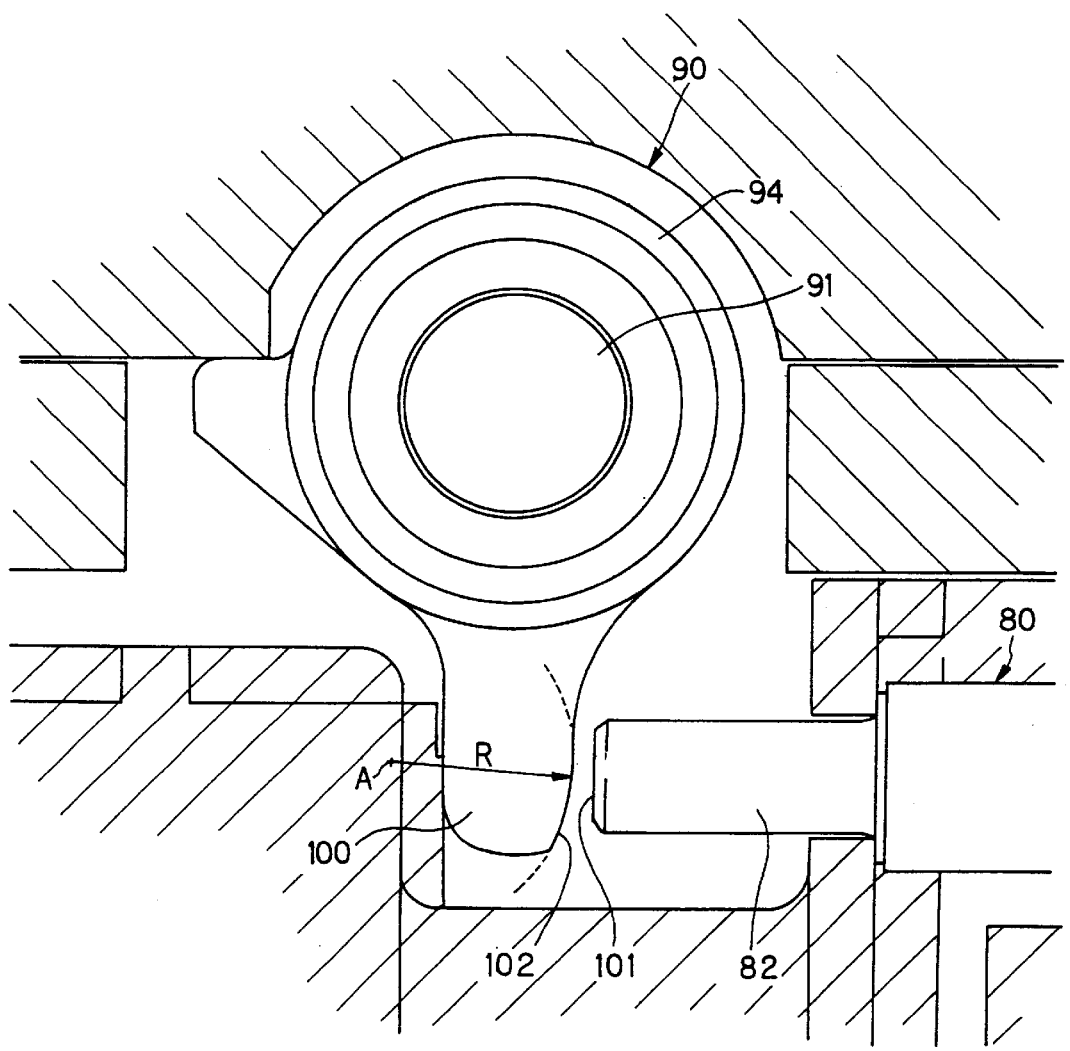
FIG. 4 is a side view of a control valve change-over mechanism of the oil pressure control device.

The arm 100 of the forward/reverse detection mechanism 90 is formed so that at least a part 102 in contact with one end face 101 of the spool 82 forms an arc, as shown in FIG. 4. In the figure, A is the center of curvature of the arc part 102, and R is the radius of curvature of the arc part 102.

Figure 5:
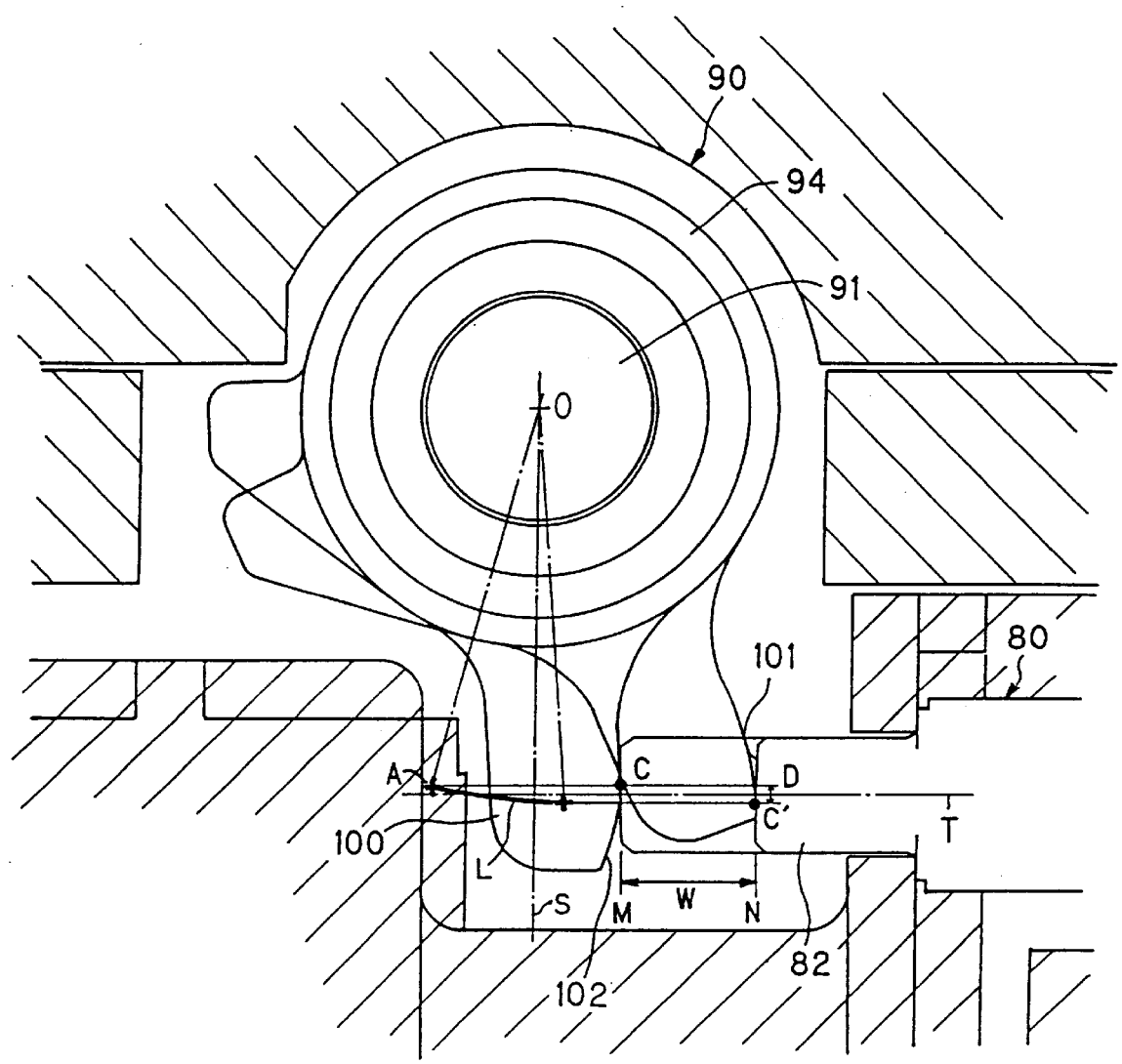
FIG. 5 is similar to FIG. 4, but showing the control valve change-over mechanism in operation.

As shown in FIG. 5, The locus L of the center of curvature A when the spool 82 is moved from an advancing position M to a reversing position N, intersects with a perpendicular line S dropped vertically from a center O of the support shaft 91 to a center axis T of the spool 82. The center O of the support shaft 91 is a rotation center of the arm 100.

The spool 82 displaces within a region defined by the perpendicular line S and the end face 101 of the spool 82 does not extend beyond the perpendicular line S even if the spool 82 moves to the advancing position M. The radius of curvature R of the arc part 102 of the arm 100 may be set to the same length as a stroke length W of the spool 82.

Therefore, when the forward/reverse change-over mechanism 40 is changed over to the reverse state, the arm 100 rotates together with the collar 94 of the forward/reverse detection mechanism 90. The arc part 102 of the arm 100 then pushes the spool 82, and the spool 82 displaces to the reversing position N.

The contact point of the arc part 102 and the end face 101 is a point C dropped perpendicularly from the center of curvature A to the end face 101. A slip amount D of the arc part 102 relative to the end face 101, i.e., a displacement of the contact point C in the vertical direction, is only small as shown in FIG. 5.

Here, the slip amount D is a minimum when the spool 82 is displaced so that the center of curvature A is symmetrically displaced to the left and right of the perpendicular line S. If the spool 82 is displaced so that the locus L of the center of curvature A intersects with the perpendicular line S as described above, the slip amount D can be reduced sufficiently.

Further, as the end face 101 of the spool 82 never extends beyond the perpendicular line S, the radius of curvature R of the arc part 102 can be increased, and the surface pressure between the arc part 102 and the end face 101 of the spool 82 can be reduced.

Therefore, according to this invention, wear and friction of the arc part 102 of the arm 100 and the end face 101 of the spool are reduced. Further, torque losses are reduced, so the spool 82 moves smoothly to the reversing position.

The entire contents of Japanese Patent Application P10-215532 (filed Jul. 30, 1998) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. An oil pressure control device of a toroidal continuously variable transmission for a vehicle, said transmission comprising a toroidal unit, a hydraulic actuator driving said toroidal unit, said device comprising:

a first valve and a second valve for operating said actuator;

an arm which changes a rotation direction according to a running direction of said vehicle; and a change-over valve comprising a spool in contact with said arm, said change-over valve selectively connecting said first valve and said second valve to said actuator according to a rotational displacement of said arm;

wherein said arm comprises an arc part in contact with said spool, and wherein a locus of the center of curvature of said arc part traced when said spool is displaced, intersects with a perpendicular line dropped from said rotation center of said arm that is perpendicular to a center axis of said spool.

2. An oil pressure control device as defined in claim 1, wherein said spool displaces within a region defined by said perpendicular line.

* * * * *